(12) United States Patent
Hooper

(10) Patent No.: US 7,111,157 B1
(45) Date of Patent: Sep. 19, 2006

(54) SPURIOUS INPUT DETECTION FOR FIRMWARE

(75) Inventor: Christopher D. Hooper, Fremont, CA (US)

(73) Assignee: 3PARdata, Inc., Fremont, CA (US)

( * ) Notice: Subject to any disclaimer, the term of this patent is extended or adjusted under 35 U.S.C. 154(b) by 519 days.

(21) Appl. No.: 10/142,402

(22) Filed: May 8, 2002

(51) Int. Cl.
*G06F 15/177* (2006.01)

(52) U.S. Cl. .............................................. 713/1; 713/2

(58) Field of Classification Search ................ 713/1, 713/2
See application file for complete search history.

(56) References Cited

U.S. PATENT DOCUMENTS

| | | | | |
|---|---|---|---|---|
| 5,826,075 | A * | 10/1998 | Bealkowski et al. | 713/187 |
| 5,894,583 | A * | 4/1999 | Johnson et al. | 710/48 |
| 5,937,159 | A * | 8/1999 | Meyers et al. | 713/201 |
| 6,101,617 | A * | 8/2000 | Burckhartt et al. | 714/23 |
| 6,125,697 | A * | 10/2000 | Holton et al. | 73/309 |
| 6,282,601 | B1 * | 8/2001 | Goodman et al. | 710/260 |
| 6,356,965 | B1 * | 3/2002 | Broyles et al. | 710/104 |
| 6,560,711 | B1 * | 5/2003 | Given et al. | 713/200 |
| 2002/0010715 | A1 * | 1/2002 | Chinn et al. | 707/514 |
| 2002/0133641 | A1 * | 9/2002 | Royer et al. | 709/329 |
| 2003/0061240 | A1 * | 3/2003 | McCann et al. | 707/200 |
| 2003/0204709 | A1 * | 10/2003 | Rich et al. | 713/1 |
| 2004/0070920 | A1 * | 4/2004 | Flueli | 361/500 |

OTHER PUBLICATIONS

Hashimoto Kazuaki, "System and Method for Preventing Illegal Access of Computer", Jan. 30, 2001, Patent Abstract of Japan, Japanese Publication 2001-027911.*
Dictionary of Computing, 1996, Oxford University Press, Fourth Edition, pp. 411, 420.*
Newsgroup comp.os.ms-windows.win95.misc, "Booting to Safe Mode after a crash: how can I stop it?", Oct. 9, 1999, Message ID gzHL3. 17303$0d.62807@news.rdc1.il.home.com.*

* cited by examiner

*Primary Examiner*—Lynne H. Browne
*Assistant Examiner*—Tse Chen
(74) *Attorney, Agent, or Firm*—Patent Law Group LLP

(57) ABSTRACT

A system and method for detecting and handling spurious input are disclosed. In one embodiment, upon receipt of an interrupt signal, a device activates command and keystroke timeouts. The keystroke timeout may have a shorter duration than the command timeout and may be reset upon receipt of a keystroke. At the first expiration of either the keystroke or command timeouts, the device generates a user message. At the second expiration of either the keystroke or command timeouts, the device resumes initialization or resets.

8 Claims, 2 Drawing Sheets

SPURIOUS INPUT DETECTION FOR FIRMWARE

CROSS-REFERENCE TO RELATED APPLICATION

This patent application relates to U.S. patent application Ser. No. 09/633,088 entitled "Data Storage System," filed Aug. 4, 2000, the disclosure of which is hereby incorporated by reference in its entirety.

TECHNICAL FIELD

The present invention relates in general to data processing systems and methods and, in particular, to an apparatus and method for spurious input detection and handling.

BACKGROUND

Data processing devices, such as personal computer and server systems are well known in the art. Such devices have attained widespread use and typically include one or more central processing units and associated volatile and non-volatile memory, including random access memory (RAM) and basic input/output system read only memory (BIOS ROM), along with one or more input/output devices and external interfaces.

When a data processing device is reset or initially powered-on, an initialization, or boot process begins. The BIOS generally provides instructions for the tasks that the device performs at start-up. These tasks, may include, for example, hardware initialization, Power-On Self Test (POST), and booting an operating system. Furthermore, the BIOS provides an interface to the underlying hardware for the operating system in the form of a library of interrupt handlers.

Some BIOS systems permit interruption of the initialization process to allow system configuration, maintenance, diagnostic test, or the like. Typically, such BIOS systems interrupt and stop the initialization process upon receipt of an interrupt signal, such as that generated by a certain keystroke or keystroke sequence. Upon receipt of such a keystroke, the BIOS system stops initialization and waits indefinitely for a valid command. If such a valid command is not entered, the BIOS system will not resume initialization, thus preventing initialization of the device.

In some instances, a BIOS system may stop initialization in response to receiving a spurious interrupt signal rather than an intentional keystroke by a user. The spurious interrupt signal may be generated, for example, by an inadvertent keystroke by the user or by random noise on an input line, which may cause such a spurious interrupt signal to be generated that the BIOS interprets as an interrupt signal. A system management interrupt signal may also cause a BIOS to stop and to wait indefinitely for user input.

When, in response to an interrupt signal, a BIOS stops initialization and waits indefinitely for a valid user command. If no such valid user command is provided, the initialization process will not resume and the associated device will not complete the initialization process.

If the user is not monitoring a console associated with the device, the user may not be aware that the device is waiting for a valid user command. Rather, the user may believe that the device is malfunctioning and that a service call is required.

One conventional approach for limiting the potential for an interrupt signal to stop hardware initialization indefinitely is to only permit an interrupt signal to be received during a small time window. Some personal computer BIOS systems function in this manner. A limitation of this approach is that initialization of such a BIOS system may be indefinitely stopped if the interrupt signal is received during the time window. Another limitation is that the smaller this window, the less convenient it becomes for the interactive user.

Another conventional approach for limiting the potential for an interrupt signal to stop hardware initialization is to design the entry sequence such that the entry sequence is not likely to be accidentally typed. However, this approach is also limited in that if the entry sequence, or another interrupt signal, is received by the BIOS, the BIOS may be indefinitely stopped until suitable action, such as the entry of a valid command, is taken.

Accordingly, a need exists for a system and method for detecting and handling an interrupt signal such that system operation is not impaired.

SUMMARY

In general, according to some embodiments interrupt signals are detected and handled such that system operation is not indefinitely suspended.

According to one aspect of the invention, a data processing device receives an interrupt signal and ceases initialization in response to the interrupt signal. The data processing device prompts for an input command. After the expiration of a first time period, the data processing device presents a user message if the data processing device does not receive a valid input command during the first time period. The data processing device resumes initialization or resets after expiration of a second time period if the data processing device does not receive a valid input command during the second time period. The data processing device may resume initialization upon receiving a valid input command.

The interrupt signal may comprise a system management interrupt, a user keystroke, spurious input, or the like. The first and second time periods may be of same or different durations.

Pursuant to another aspect of the invention, a data processing device activates a keystroke timeout and a command timeout, the keystroke and command timeouts ceasing operation of an incomplete task in response to receiving an interrupt signal. The data processing device prompts for a command and deactivates the keystroke and command timeouts in response to receiving a valid command. The data processing device may further determine whether a keystroke has been received and restarts the keystroke timeout if a keystroke has been received. The data processing device presents a user message at a first termination of either the keystroke timeout or the command timeout and resumes initialization or resets at a second termination of either the keystroke timeout or the command timeout.

The data processing device may comprise a personal computer, a server computer, or a node of a server cluster in a data storage system.

In accordance with yet another aspect of the present invention, a data processing device ceases initialization of the device hardware in response to the interrupt signal and prompts for an input command. The data processing device then presents a user message after expiration of a first time period if the data processing device does not receive a valid input command during the first time period and a user message has not been previously presented. The data processing device resumes initialization of the hardware device after expiration of a second time period if the data processing device does not receive a keystroke within the second time period.

The data processing device then resumes initialization or resets the data processing device after expiration of the first time period if the data processing device does not receive a valid input command during the first time period and a user message has been previously presented. If the data processing device does not receive a keystroke during the second time period and a user message has been previously presented, the data processing device resumes initialization or resets the data processing device after expiration of the second time period.

Additional details regarding the present system and method may be understood by reference to the following detailed description when read in conjunction with the accompanying drawings.

BRIEF DESCRIPTION OF THE DRAWINGS

Common reference numerals are used throughout the drawings and detailed descriptions to indicate like elements.

DETAILED DESCRIPTION

It is sometimes necessary to suspend or abort device hardware initialization in order to perform diagnostic tests, device configuration, device maintenance, or the like. The initialization is typically suspended or aborted upon receipt of an interrupt signal. This functionality is convenient in that it generally permits easy suspension of the initialization, but may make the device hardware less reliable in environments where there may be spurious input.

Some embodiments of the present invention present the user with a prompt, such as a command line or password entry request, upon receipt of an interrupt signal. If the system does not receive a valid command within a predetermined amount of time after presenting the user with the prompt, the system may present the user with a warning message, resume operation, or reset. In this manner, if system initialization stops in response to an interrupt signal, the system initialization will resume, or the system will restart, if no valid command is received within a predetermined amount of time, thereby preventing the system from waiting indefinitely for a valid user command.

Figure 1:
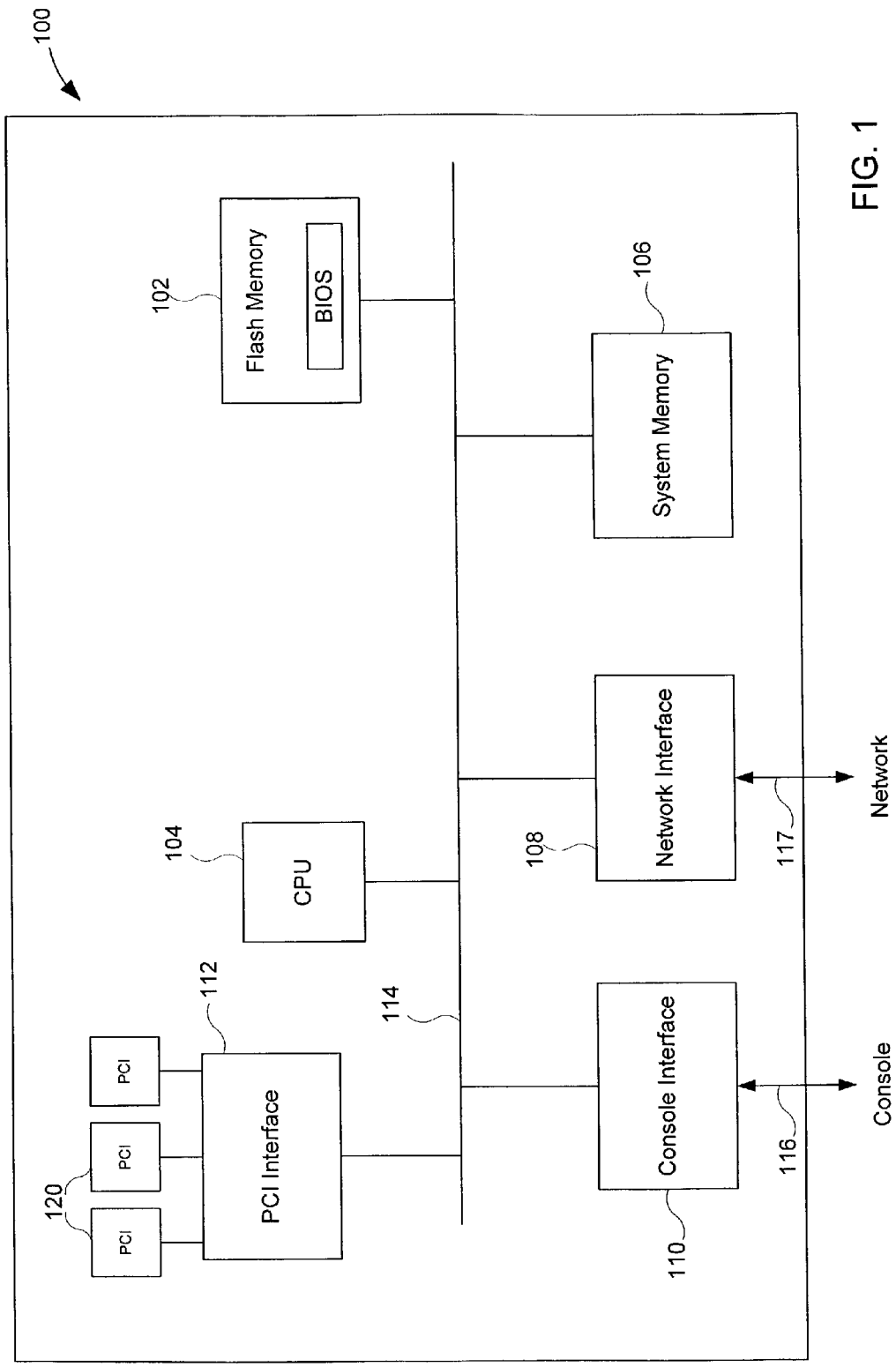
FIG. 1 is a diagram illustrating a data processing device in accordance with one embodiment of the present invention.

FIG. 1 illustrates an exemplary embodiment of a data processing device 100 in accordance with the present invention. In general, the device 100 can be implemented using a multi-processor capable chipset that may include system memory controller (not shown), one or more PCI buses and a system bus for multiple processors. As shown, the device 100 includes flash memory 102, one or more central processing units (CPUs) 104, system memory 106, a network interface 108, a console interface 110, and a PCI (Peripheral Component Interconnect) interface 112, all coupled by at least one bus 114. PCI devices 120 are connected to the PCI interface 112. The device 100 may in one embodiment comprise a server computer. Optionally, the device 100 may comprise a node, such as a node described in U.S. patent application Ser. No. 09/633,088 incorporated herein by reference.

The one or more or more central processing units (CPUs) 104 generally provide processing capability, such as for the control of data transfers through the device 100. Each CPU 104 can be implemented with any suitable processing device, such as, for example, a PENTIUM III or PENTIUM IV processor, by Intel Corporation.

The system memory 106 is coupled to the bus 114 and may be implemented, for example, with synchronous dynamic random access memory (SDRAM). In some embodiments, the system memory 106 generally functions to store data and information used in controlling data transfers.

The PCI interface 112 is coupled to the bus 114 and generally functions as a bridge between PCI and industry standard architecture (ISA), integrated drive electronics (IDE), and other legacy interfaces on a PC platform. PCI devices 120 connect to the PCI interface 112. The PCI devices 120 may comprise one or more disk drives, or any of a variety of suitable PCI cards.

The console interface 110 may comprise an RS-232 serial port for connecting to a console (not shown) over line 116 and generally functions to support bi-directional serial communications between the device 100 and the console. The console interface 110 serves as a diagnostic port for exchanging diagnostic information with the console.

The network interface 108, which may comprise an Ethernet port, is also coupled to the bus 114 and may support a network connection with hardware external or remote to the device 100. In one embodiment, the network interface 108 can be implemented as a 10/100 Base-T Ethernet hub. The device 100 may receive management and control data over line 117 via the network interface 108.

Figure 2:
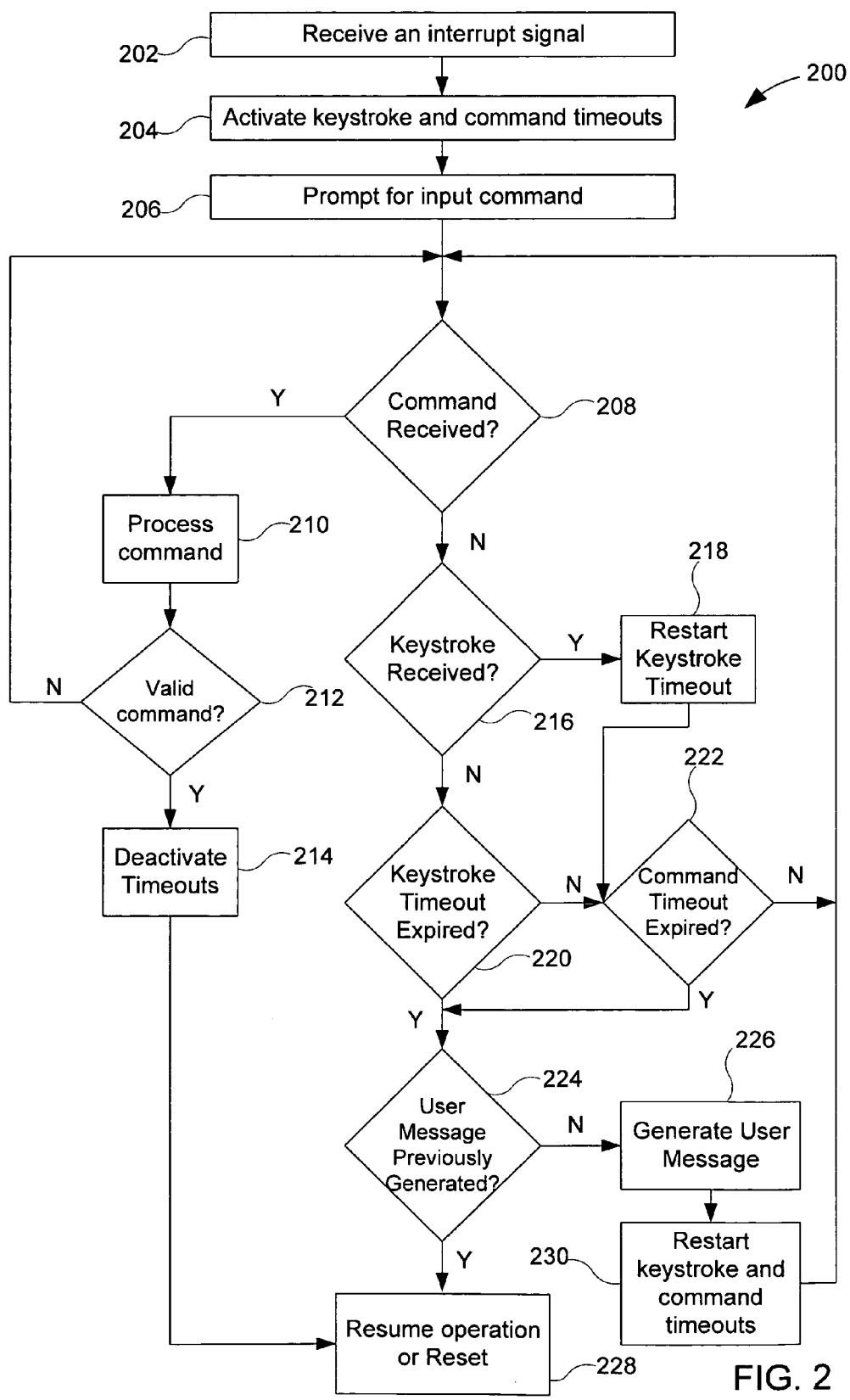
FIG. 2 is a flowchart illustrating a method in accordance with one embodiment of the present invention.

FIG. 2 illustrates a flowchart 200 illustrating one embodiment of a method in accordance with the present invention. At block 202, the device 100 receives an interrupt signal. The device 100 may receive the interrupt signal over line 116. Alternatively, the device 100 may generate the interrupt signal internally. An interrupt signal is a signal received by the device 100 that causes the device 100 to cease, suspend, or stop an incomplete task, such as an initialization process, or running an operating system. A common use of an interrupt signal is to temporarily suspend normal data processing operations to immediately manage an internally-generated interrupt. Normal data processing operations are resumed after management of the internally-generated interrupt is completed.

In some embodiments, the interrupt signal may comprise, for example, spurious input, a user keystroke, an unhandled system management interrupt signal, or the like. As discussed above, the spurious input may occur on the line 116 due to any of a variety of sources, such as radio frequency signals or other random noise on the line 116.

The user keystroke may be intentional or unintentional. That is, a user may intentionally enter a particular keystroke that serves as an interrupt signal. However, a keystroke serving as an interrupt signal may alternatively be entered unintentionally, such as by dropping an object on the keyboard or otherwise accidentally causing such a keystroke to be entered.

The interrupt signal may comprise an unhandled non-maskable system management interrupt signal, such as that caused by a "SALERT#" signal, that stops operation of the device 100. The system management interrupt (SMI) signal may be generated, for example, by one of the PCI devices 120 and received by the CPU 104 via the bus 114.

Next, at block 204, in response to receipt of the interrupt signal, the device 100 activates a keystroke timeout and a command timeout. In one embodiment, the the interrupt signal causes the suspension of the initialization process of the device 100. In another embodiment, the the interrupt signal causes the operating system running on the device 100 to suspend operation. The duration of the keystroke and command timeouts may vary. The duration of the keystroke timeout may be shorter than the duration of the command timeout. In an example embodiment, the duration of the keystroke timeout is about 20 seconds and the duration of the command timeout is about 40 seconds.

At block 206, the device 100 prompts for an input command. Pursuant to one embodiment, the device 100 sends a prompt for an input command to an external console (not shown) over the line 116 via the console interface 110. Upon receiving the prompt for an input command, the external console may display a command line or a graphical user interface (GUI) that invites a user to enter a command.

At block 208, the device 100 determines whether the device 100 has received a command. According to one embodiment, the device 100 may determine that the device 100 has received a command if the device 100 has received a carriage return signal. In another embodiment, the device 100 may determine that the device 100 has received a command if the device 100 has received at least one keystroke followed by a carriage return signal. Pursuant to one embodiment, the command may comprise a result of a user interaction with the GUI.

If, pursuant to block 208, the device 100 determines that no command has been received, execution proceeds to block 216, else execution proceeds to block 210. At block 210, the device 100 processes the command. After the device 100 has processed the command, execution proceeds to block 212. At block 212, the device 100 determines whether the received command comprises a valid command.

In one embodiment, the device 100 determines that the command is valid if the command matches one of a predetermined set of commands. If, pursuant to block 212, the device 100 determines that the received command comprises a valid command, execution proceeds to block 214, else execution returns to block 208. At block 214, the device 100 deactivates the keystroke and command timeouts, thus permitting the device 100 to resume operation.

Referring again to block 208, if the device 100 determines that a command has not been entered, execution proceeds to block 216. At block 216, the device 100 determines whether a keystroke has been received, such as over the line 116. If the device determines that a keystroke has been received, execution proceeds to block 218, at which the keystroke timeout is restarted. After the device 100 restarts the keystroke timeout pursuant to block 218, execution proceeds to block 222.

If, however, at block 216, the device 100 determines that a keystroke has not been received, execution proceeds to block 220. At block 220, the device 100 determines whether the keystroke timeout has expired. As mentioned above, in an example embodiment, the duration of the keystroke timeout may be about twenty seconds. Hence, according to this example embodiment, at block 220, the device 100 determines if twenty or more seconds have passed since the keystroke timeout was activated or last reset. If the device 100 determines that the keystroke timeout has not expired, execution proceeds to block 222, else execution proceeds to block 224.

At block 222, the device 100 determines whether the command timeout has expired. As mentioned above, in an example embodiment, the duration of the command timeout may be about forty seconds. Hence, according to this example embodiment, at block 222, the device 110 determines if forty or more seconds have passed since the command timeout was activated. If the device 100 determines that the command timeout has expired, pursuant to block 222, execution proceeds to block 224, else execution returns to block 208.

At block 224, the device 100 determines whether a user message has been previously generated since the activation of the keystroke and command timeouts in block 204. If, pursuant to block 224, the device 100 determines that the device 100 has previously generated a user message since the activation of the keystroke and command timeouts, execution proceeds to block 228, else execution proceeds to block 226.

At block 226, the device 100 generates a user message. In one embodiment, the device 100 generates a user message and sends the user message over the line 116 to a console (not shown) for viewing by a user. The user message may comprise a message warning the user that if the user does not enter a valid command, such as within a certain time period, that device will resume operation or reset. After generating the user message pursuant to block 226, execution proceeds to block 230, wherein the device 100 restarts, or resets, the keystroke timeout and the command timeout and program execution returns to block 208.

If, however, at block 224, the device 100 determines that the device 100 has previously generated a user message since the activation of the keystroke and command timeouts, execution proceeds to block 228. At block 228, the device 100 resumes operation or resets. In one embodiment, at block 228, the device 100 resumes an initialization process. In another embodiment, at block 228, the device 100 resets the device 100.

In an alternate embodiment, if the device 100 does not receive a valid command before expiration of the command timeout, the device 100 resumes operation or resets, thereby preventing the device 100 from suspending operation indefinitely.

In another embodiment, if the device 100 does not receive a keystroke before expiration of the keystroke timeout, the device 100 resumes operation or resets.

The above-described embodiments of the present invention are meant to be merely illustrative and not limiting. Thus, those skilled in the art will appreciate that various changes and modifications may be made without departing from this invention in its broader aspects. Therefore, the appended claims encompass such changes and modifications as fall within the scope of this invention.

What is claimed is:

1. A method, comprising:
   starting an initialization of a data processing device;
   receiving an interrupt signal external to the initialization;
   in response to the interrupt signal:
      suspending the initialization;
      activating a keystroke timeout and a command timeout;
      prompting for a command;
      in response to receiving a valid command prior to the keystroke timeout and the command timeout expiring:
         processing the valid command;
         deactivating the keystroke and command timeouts; and
         resuming the initialization;
      in response to receiving a keystroke prior to the keystroke timeout expiring, resetting the keystroke timeout; and in response to the keystroke timeout or the command timeout expiring:

determining if the keystroke timeout or the command timeout has expired before;

if the keystroke timeout or the command timeout has not expired before:

presenting a user message; and resetting both the keystroke timeout and the command timeout; and if the keystroke timeout or the command timeout has expired before, resuming the initialization or restarting the data processing device.

2. The method of claim 1, wherein the interrupt signal comprises a system management interrupt.

3. The method of claim 1, wherein the interrupt signal comprises a user keystroke.

4. The method of claim 1, wherein the interrupt signal comprises a spurious input.

5. The method of claim 1, wherein the keyboard and command timeouts are of a same duration.

6. The method of claim 1, wherein the keyboard and command timeouts are of different durations.

7. The method of claim 1, wherein the data processing device comprises a server computer.

8. The method of claim 1, wherein the data processing device comprises a portion of a server cluster in a data storage system.

* * * * *